US009708923B2

(12) United States Patent
Sorokes et al.

(10) Patent No.: US 9,708,923 B2
(45) Date of Patent: Jul. 18, 2017

(54) ADJUSTABLE LABYRINTH SEAL

(71) Applicants: James M. Sorokes, Olean, NY (US);
Igor M. Belousov, Erie, PA (US);
Chris M. Leasure, Freedom, PA (US);
Austin Kimes, Olean, NY (US); Tyler Johnson, Bearlake, PA (US)

(72) Inventors: James M. Sorokes, Olean, NY (US);
Igor M. Belousov, Erie, PA (US);
Chris M. Leasure, Freedom, PA (US);
Austin Kimes, Olean, NY (US); Tyler Johnson, Bearlake, PA (US)

(73) Assignee: Dresser-Rand Company, Olean, NY (US)

( * ) Notice: Subject to any disclaimer, the term of this patent is extended or adjusted under 35 U.S.C. 154(b) by 421 days.

(21) Appl. No.: 14/487,168

(22) Filed: Sep. 16, 2014

(65) Prior Publication Data

US 2015/0132126 A1 May 14, 2015

Related U.S. Application Data

(60) Provisional application No. 61/903,614, filed on Nov. 13, 2013.

(51) Int. Cl.
*F01D 11/02* (2006.01)
*F01D 11/12* (2006.01)
(Continued)

(52) U.S. Cl.
CPC ............ *F01D 11/025* (2013.01); *F01D 11/22* (2013.01); *F04D 29/10* (2013.01); *F04D 29/12* (2013.01);
(Continued)

(58) Field of Classification Search
CPC ........ F01D 11/02; F01D 11/025; F01D 11/20;
F01D 11/22; F04D 29/08; F04D 29/083;
F04D 29/086; F04D 29/10; F04D 29/102;
F04D 29/106; F04D 29/12; F04D 29/122;
F04D 29/126; F16C 33/72; F16C 33/74;
(Continued)

(56) References Cited

U.S. PATENT DOCUMENTS 2,707,118 A * 4/1955 Swartz ................. F16J 15/3208
277/558
2,849,246 A * 8/1958 Linzell ..................... F16J 15/24
277/616
(Continued)

*Primary Examiner* — Christopher Verdier
*Assistant Examiner* — Christopher R Legendre

(57) ABSTRACT

An adjustable seal and method for varying a radial distance between the adjustable seal and a rotor of a turbomachine are provided. The adjustable seal may include a first annular member defining a plurality of radial channels, and a second annular member defining a plurality of slots at least partially extending therethrough. The second annular member may be concentric with the first annular member and configured to rotate relative to the first annular member. The adjustable seal may also include a plurality of seal segments interposed between the first annular member and the second annular member. Each seal segment of the plurality of seal segments may be slidably disposed in a respective radial channel of the plurality of radial channels and may have an axial projection slidably disposed in a respective slot of the plurality of slots.

20 Claims, 8 Drawing Sheets

(51) Int. Cl.
*F04D 29/10* (2006.01)
*F04D 29/12* (2006.01)
*F16J 15/16* (2006.01)
*F16J 15/44* (2006.01)
*F16J 15/447* (2006.01)
*F16J 15/54* (2006.01)
*F01D 11/22* (2006.01)

(52) U.S. Cl.
CPC ............ *F16J 15/16* (2013.01); *F16J 15/445* (2013.01); *F16J 15/4472* (2013.01); *F16J 15/54* (2013.01)

(58) Field of Classification Search
CPC .. F16J 15/16; F16J 15/24; F16J 15/445; F16J 15/447; F16J 15/4472; F16J 15/54
See application file for complete search history.

(56) References Cited

U.S. PATENT DOCUMENTS

| | | | |
|---|---|---|---|
| 3,337,224 A * | 8/1967 | Eser, Jr. | F16J 15/26 277/547 |
| 5,558,341 A * | 9/1996 | McNickle | F16J 15/3488 277/400 |
| 2006/0097457 A1 * | 5/2006 | Flaherty | F16J 15/3272 277/543 |
| 2009/0189355 A1 * | 7/2009 | Ueda | F16J 15/342 277/350 |
| 2015/0132126 A1 * | 5/2015 | Sorokes | F01D 11/025 415/230 |

* cited by examiner

ADJUSTABLE LABYRINTH SEAL

CROSS REFERENCE TO RELATED APPLICATIONS

This application claims the benefit of U.S. Provisional Patent Application having Ser. No. 61/903,614, which was filed Nov. 13, 2013. The aforementioned patent application is hereby incorporated by reference in its entirety into the present application to the extent consistent with the present application.

BACKGROUND

FIG. 1 is a cross-sectional view of a conventional turbomachine 100, illustrated as a centrifugal compressor, including labyrinth seals 101. As illustrated, the labyrinth seals 101 may be disposed about rotor components (e.g., impellers 102) of the turbomachine 100. Additional labyrinth seals 103 may be disposed about other rotor components (e.g., a rotary shaft 104) of the turbomachine 100. An inner circumferential surface 105 of the labyrinth seals 101, 103 and an outer circumferential surface 107 of the rotor components (e.g., the impellers 102 and the rotary shaft 104), referred to herein as the rotor 102, 104, may define a radial gap or clearance 109 therebetween. The distance between the labyrinth seals 101, 103 and to the rotor 102, 104 may be adjusted (i.e., increased or decreased) to increase or decrease the radial gap 109 defined therebetween and thereby control leakage of a process fluid across the labyrinth seals 101, 103.

Conventional methods for adjusting the distance between the labyrinth seals 101, 103 and the rotor 102, 104 to increase or decrease the radial gap 109 in the turbomachine 100, however, often require that the existing labyrinth seals 101, 103 be removed and replaced with another labyrinth seal. The removal and replacement of the labyrinth seals 101, 103 may be both time consuming and costly. For example, to remove and replace the labyrinth seals 101, 103, the turbomachine 100 is typically at least partially disassembled to obtain access to the labyrinth seals 101, 103. Further, additional labyrinth seals that may provide the desired radial gap 109 must be readily available to replace the labyrinth seals 101, 103.

What is needed, then, is a labyrinth seal capable of varying the distance between the labyrinth seal and the rotor to thereby vary the radial gap in a turbomachine.

SUMMARY

Embodiments of the disclosure may provide an adjustable seal including a first annular member defining a plurality of radial channels, and a second annular member defining a plurality of slots at least partially extending therethrough. The second annular member may be concentric with the first annular member and configured to rotate relative to the first annular member. The adjustable seal may also include a plurality of seal segments interposed between the first annular member and the second annular member. Each seal segment of the plurality of seal segments may be slidably disposed in a respective radial channel of the plurality of radial channels and may have an axial projection slidably disposed in a respective slot of the plurality of slots.

Embodiments of the disclosure may further provide an adjustable seal for a turbomachine. The adjustable seal may include a first annular member having a plurality of protrusions extending axially from an annular surface thereof. The plurality of protrusions may at least partially define a plurality of radial channels of the first annular member. The adjustable seal may also include a second annular member defining a plurality of slots at least partially extending therethrough. The second annular member may be aligned with the first annular member about a longitudinal axis and configured to rotate relative to the first annular member about the longitudinal axis. A plurality of seal segments may be interposed between the first annular member and the second annular member. Each seal segment of the plurality of seal segments may be slidably disposed in a respective radial channel of the plurality of radial channels and may include an axial projection slidably disposed in a respective slot of the plurality of slots.

Embodiments of the disclosure may further provide a method for varying a radial distance between an adjustable seal and a rotor of a turbomachine. The method may include supporting the adjustable seal in a housing of the turbomachine such that the adjustable seal may be disposed radially outward of the rotor of the turbomachine. The adjustable seal may include a first annular member defining a plurality of radial channels, and a second annular member concentric with the first annular member and defining a plurality of slots at least partially extending therethrough. The adjustable seal may also include a plurality of seal segments interposed between the first annular member and the second annular member. Each seal segment of the plurality of seal segments may be slidably disposed in a respective radial channel of the plurality of radial channels and may include an axial projection slidably disposed in a respective slot of the plurality of slots. The method may also include rotating the second annular member relative to the first annular member such that the plurality of seal segments are actuated in a radial direction to thereby vary the radial distance between the adjustable seal and the rotor of the turbomachine.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
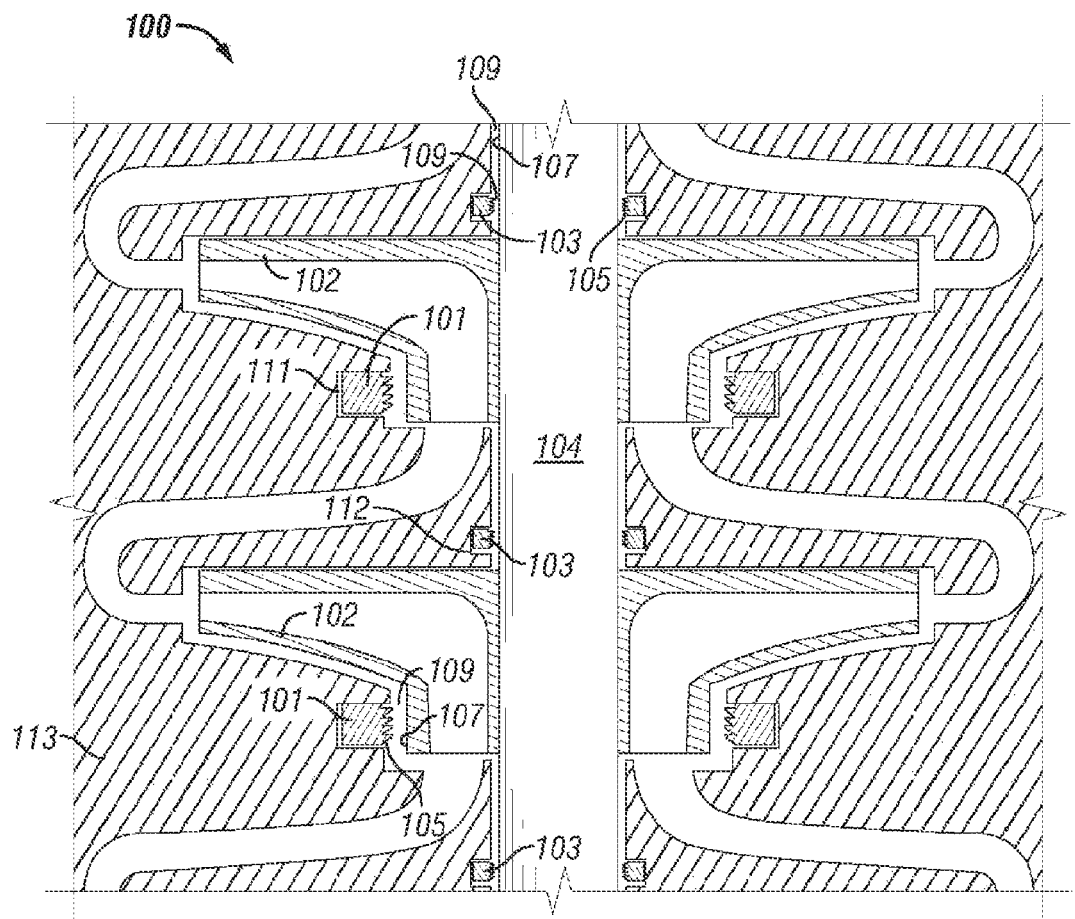
FIG. 1 illustrates a cross-sectional view of a portion of a conventional turbomachine including labyrinth seals.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2A:
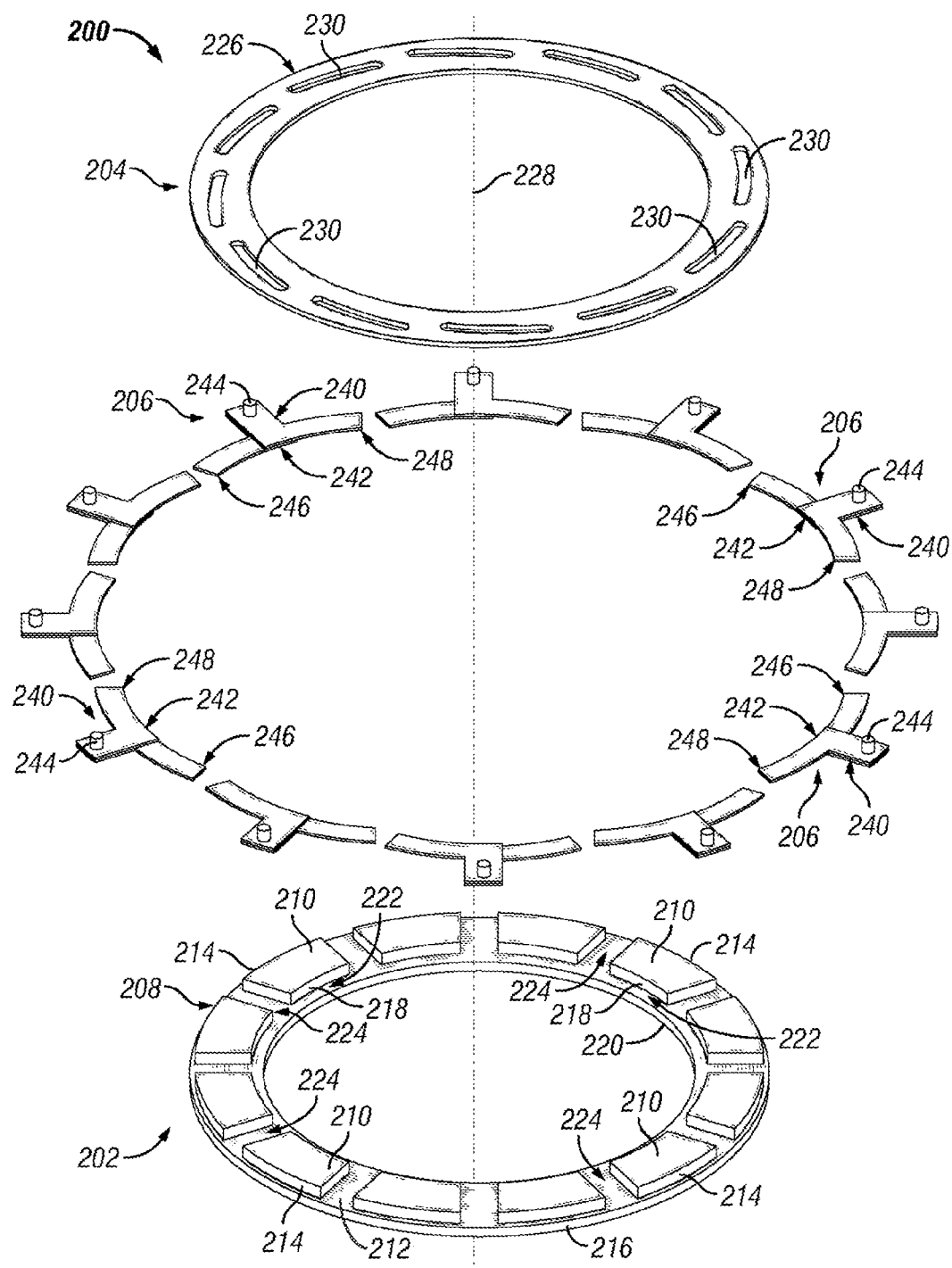
FIG. 2A illustrates an exploded view of an adjustable seal including a base member, an actuating member, and a plurality of seal segments, according to one or more embodiments disclosed.

FIG. 2A illustrates an exploded view of an adjustable seal 200 that may be utilized in place of any one or more of the labyrinth seals 101, 103 of FIG. 1, according to one or more embodiments. The adjustable seal 200 may include a base member 202, an actuating member 204, and a plurality of seal segments 206 at least partially disposed between the base member 202 and the actuating member 204.

Figure 2B:
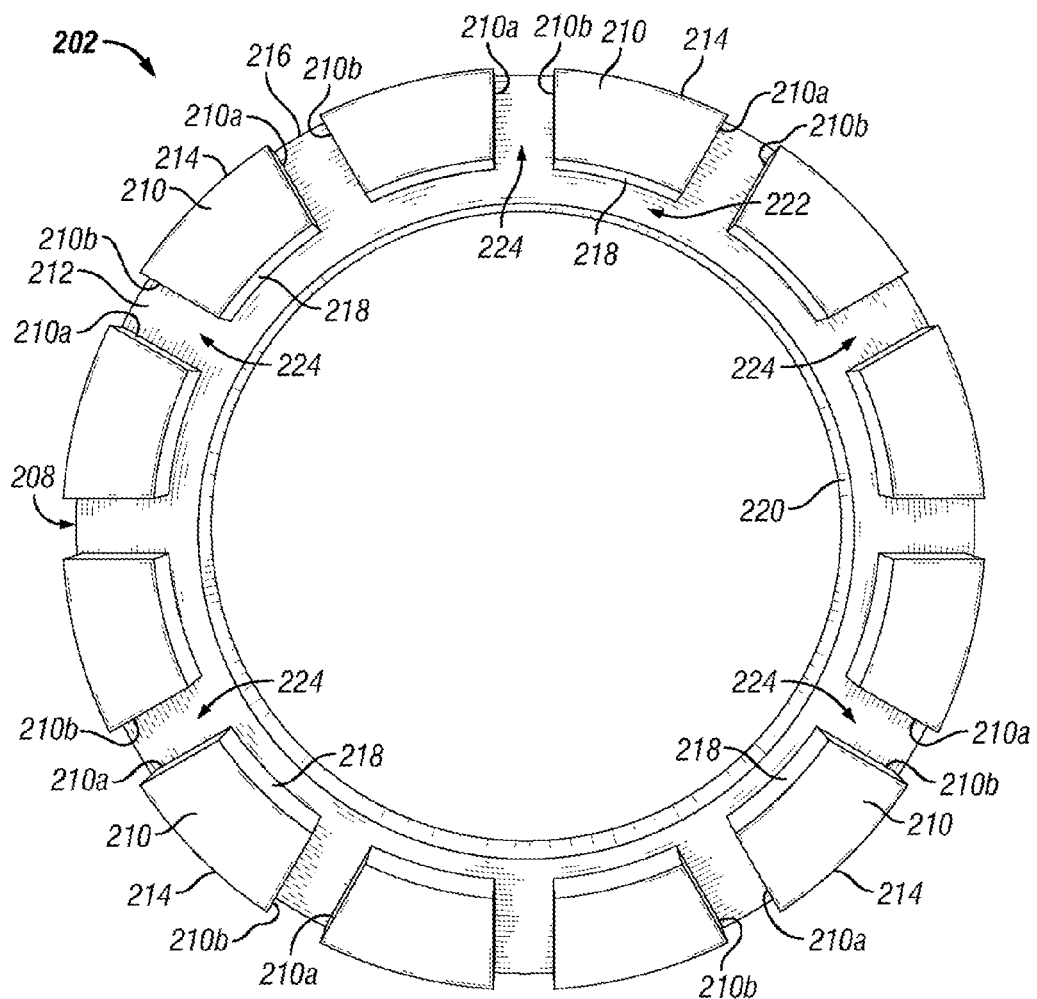
FIG. 2B illustrates a detailed, plan view of the base member of FIG. 2A, according to one or more embodiments disclosed.

As illustrated in FIG. 2A and further illustrated in detail in FIG. 2B, the base member 202 may be or include a generally annular ring 208 having a plurality of circumferentially spaced protrusions 210 extending axially from an annular surface 212 of the annular ring 208. In at least one embodiment, the protrusions 210 may be spaced at substantially equal intervals along the annular surface 212 of the base member 202. As illustrated in FIGS. 2A and 2B, each of the protrusions 210 may have a first end surface 214 disposed near or adjacent to an outer circumferential surface 216 of the annular ring 208, and a second end surface 218 disposed radially outward from an inner circumferential surface 220 of the annular ring 208. In at least one embodiment, the first end surface 214 of the protrusions 210 may have a radius of curvature substantially equal to that of the outer circumferential surface 216 of the annular ring 208. The second end surface 218 of the protrusions 210 and the annular surface 212 of the annular ring 208 may at least partially define a recess 222 extending along an inner annular portion of the annular ring 208.

In at least one embodiment, the annular surface 212 and/or the protrusions 210 extending therefrom may at least partially define a plurality of channels 224 of the base member 202. For example, as illustrated in FIG. 2B, opposing side walls of adjacent protrusions 210, indicated as 210a and 210b, may define the plurality of channels 224. In at least one embodiment, the channels 224 may extend radially along the annular surface 212 from the recess 222 to the outer circumferential surface 216 of the base member 202. As further described herein, the plurality of seal segments 206 may be at least partially slidably disposed in the plurality of channels 224.

Figure 2C:
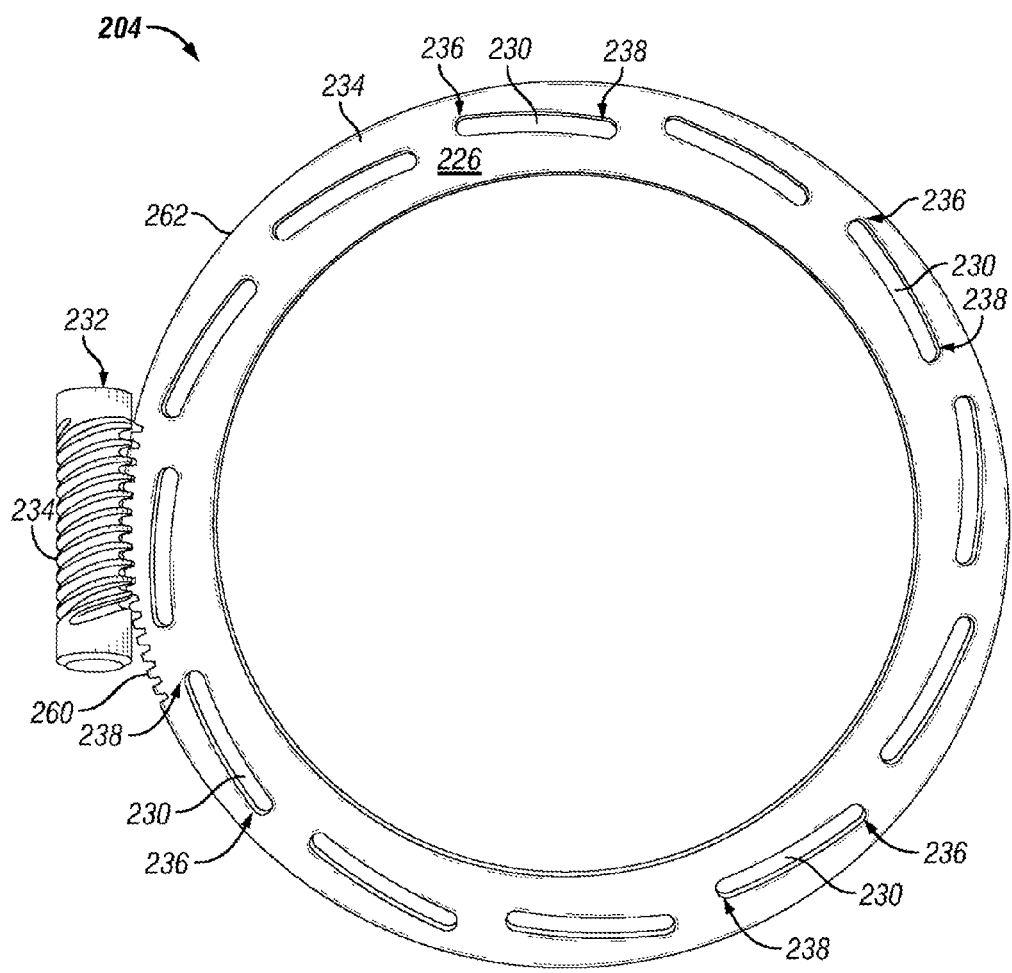
FIG. 2C illustrates a detailed, plan view of the actuating member of FIG. 2A, according to one or more embodiments disclosed.

As illustrated in FIG. 2A, the actuating member 204 may be or include a generally annular ring 226 concentric with the base member 202 along a common axis 228 (e.g., longitudinal axis). The annular ring 226 may be configured to rotate about the longitudinal axis 228 relative to the base member 202. In at least one embodiment, the annular ring 226 may define a plurality of slots 230 at least partially extending therethrough. As illustrated in FIG. 2C, the plurality of slots 230 may be circumferentially spaced (e.g., at equally-spaced intervals) about the actuating member 204. In at least one embodiment, at least a portion of the slots 230 may be arcuate or curved. For example, as illustrated in FIG. 2C, the slots 230 may be curved between a first end portion 236 and a second end portion 238 thereof. In at least one embodiment, the first end portion 236 and the second end portion 238 of the slots 230 may be radially offset with respect to one another such that the slots 230 may be angled or have an angular orientation. For example, as illustrated in FIG. 2C, the second end portion 238 of the slots 230 may be disposed radially inward from the first end portion 236. Accordingly, in an exemplary embodiment, the slots 230 may be curved radially inward from the first end portion 236 to the second end portion 238 such that a radius of curvature of the slots 230 may be angled with respect to a radius of curvature of the annular ring 226.

As previously discussed, the actuating member 204 may be configured to rotate about the longitudinal axis 228 relative to the base member 202 (see FIG. 2A). In at least one embodiment, the actuating member 204 may be driven or rotated via one or more gears 232 (one is shown in FIG. 2C) of the turbomachine 100. For example, as illustrated in FIG. 2C, the annular ring 226 may define a plurality of teeth 260 extending along at least a portion of an outer circumferential surface 262 thereof. The teeth 260 of the actuating member 204 may be configured to engage with corresponding teeth 234 formed in the gears 232 of the turbomachine 100. Accordingly, the gears 232 may be driven or rotated to correspondingly rotate the actuating member 204. Exemplary gears 232 may include, but are not limited to, worm gears, bevel gears, helical gears, or the like.

Referring back to FIG. 2A, each of the plurality of seal segments 206 may include a body portion 240 configured to be slidably disposed in the channels 224 of the base member 202, and a seal portion 242 configured to be slidably disposed in the recess 222 of the base member 202. The seal segments 206 may also include a projection 244 extending axially from the body portion 240 and configured to be slidably disposed in the slots 230 defined in the actuating member 204. In at least one embodiment, the seal portion 242 may be arcuate and may include a first end portion 246 and a second end portion 248 extending from the body portion 240 in opposing circumferential directions. For example, the first end portion 246 may extend from the body portion 240 in a first circumferential direction (e.g., counterclockwise as viewed in FIG. 2A) and the second end portion 248 may extend from the body portion 240 in a second circumferential direction (e.g., clockwise as viewed in FIG. 2A). As further described herein, with reference to FIGS. 4A and 4B, the seal segments 206 may at least partially define the radial gap or clearance 109 between the adjustable seal 200 and the rotary shaft 104 of the turbomachine 100.

Figure 2D:
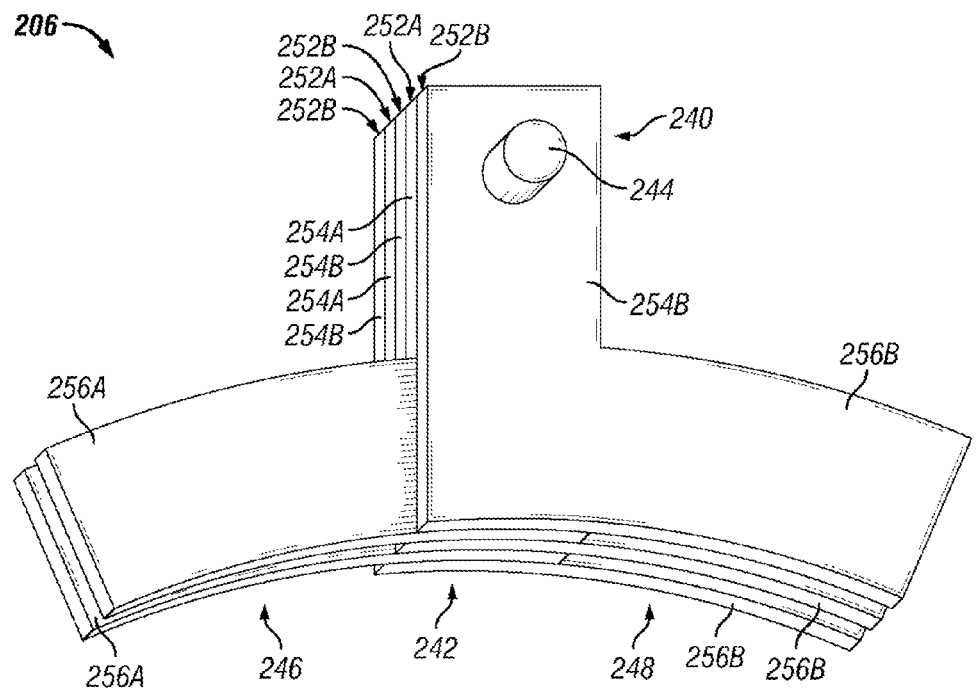
FIG. 2D illustrates a detailed, perspective view of an exemplary seal segment of the plurality of seal segments of FIG. 2A, according to one or more embodiments disclosed.
Figure 2E:
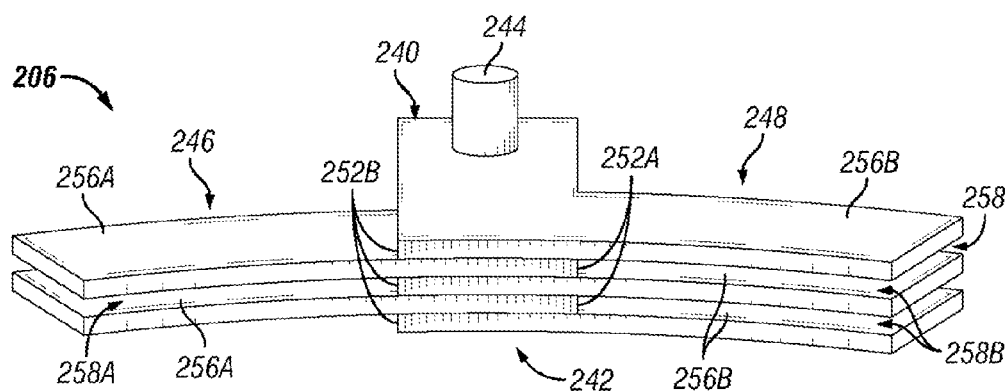
FIG. 2E illustrates a detailed, perspective view of the exemplary seal segment of FIG. 2D, according to one or more embodiments disclosed.

In at least one embodiment, each of the seal segments 206 may be fabricated (e.g., cast or machined) as a monolithic or single piece. In another embodiment, each of the seal segments 206 may be fabricated from a plurality of pieces or components coupled with one another. For example, as illustrated in FIGS. 2D and 2E, each of the seal segments 206 may include a plurality of seal elements (indicated as 252A and 252B), coupled with one another. Each of the seal elements 252A, 252B may be or include a generally L-shaped plate or sheet having a first arm 254A, 254B and a second arm 256A, 256B. In at least one embodiment, the seal elements 252A, 252B may be coupled with one another along the first arm 254A, 254B thereof. For example, as illustrated in FIGS. 2D and 2E, the adjacent seal elements 252A, 252B may be coupled with one another along the first arms 254A, 254B thereof. The seal elements 252A, 252B may be coupled with one another along the first arm 254A, 254B to at least partially form the body portion 240 of the seal segment 206.

In at least one embodiment, the second arms 256A, 256B may be arcuate and may at least partially form the seal portion 242 of the seal segments 206. For example, as illustrated in FIGS. 2D and 2E, the seal elements 252A, 252B may be coupled with one another such that the second arms 256A of the seal elements 252A extend in the first circumferential direction (e.g., counterclockwise) to form the first end portion 246 of the seal segments 206, and the second arms 256B of the seal segments 252B extend in the second circumferential direction (e.g., clockwise) to form the second end portion 248 of the seal segments 206.

In at least one embodiment, the second arms 256A, 256B may define one or more gaps 258A, 258B in the seal portion 242 of the seal segments 206. For example, as illustrated in FIG. 2E, the second arms 256A of the seal elements 252A may at least partially define one or more axial gaps (one is shown 258A) in the first end portion 246 of the seal segment 206. In another example, the second arms 256B of the seal elements 252B may at least partially define one or more axial gaps (two are shown 258B) in the second end portion 248 of the seal segment 206. As further described herein, with reference to FIGS. 3A and 3B, the axial gaps 258A, 258B may allow the seal portions 242 of adjacent seal segments 206A, 206B to at least partially overlap with one another to prevent leakage of a process fluid through the adjustable seal 200.

Figure 3A:
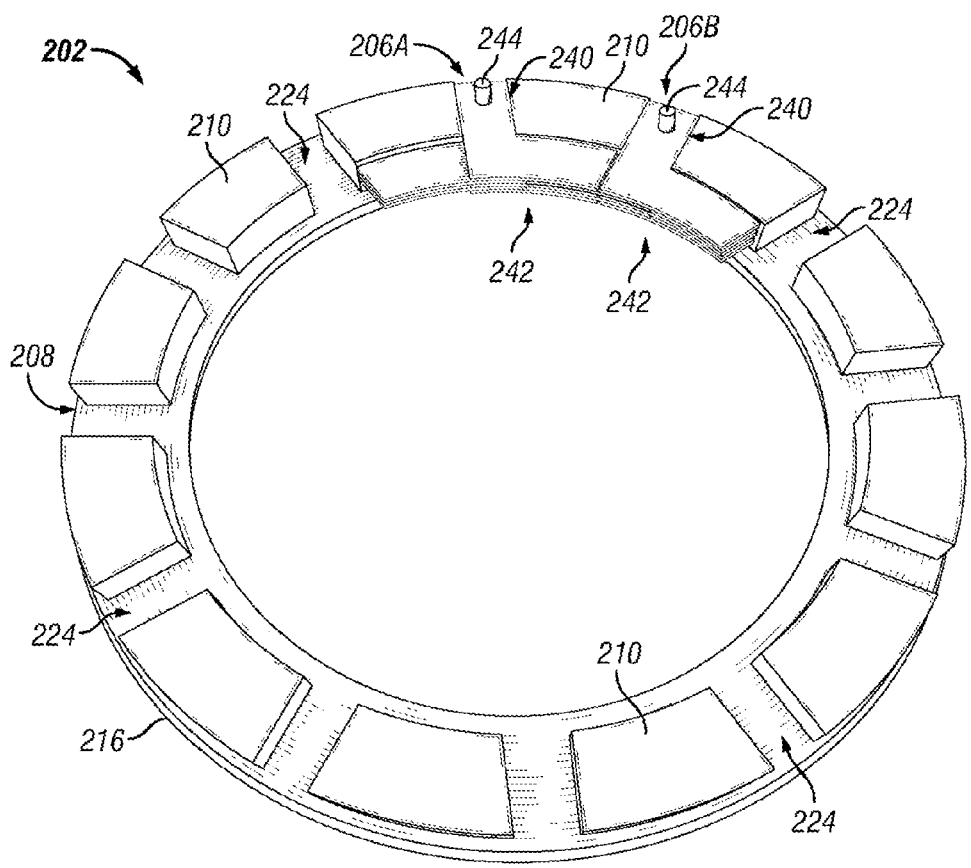
FIG. 3A illustrates a perspective view of adjacent seal segments installed in the base member of FIG. 2A, according to one or more embodiments disclosed.
Figure 3B:
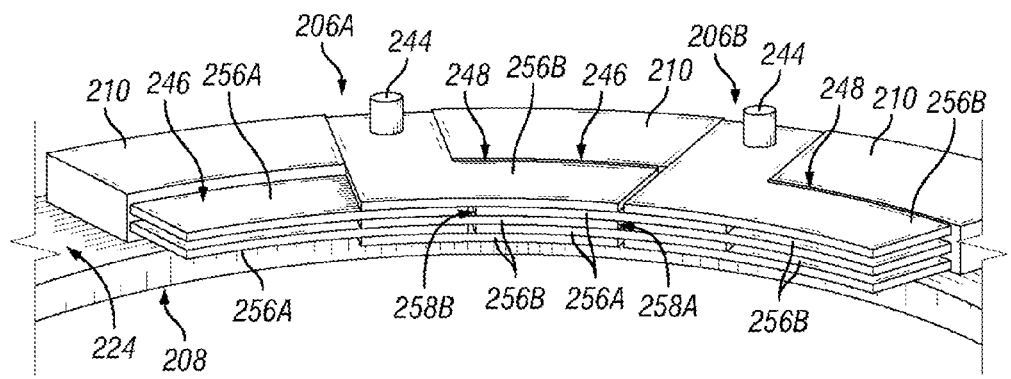
FIG. 3B illustrates a detailed, perspective view of the adjacent seal segments of FIG. 3A installed in the base member of FIG. 2A, according to one or more embodiments disclosed.

Referring to FIGS. 3A and 3B, the adjustable seal 200 may be assembled or fabricated by slidably disposing the body portion 240 of the seal segments 206A, 206B in the respective channels 224 of the base member 202. For simplicity, FIGS. 3A and 3B illustrate two adjacent seal segments (indicated as 206A and 206B) at least partially disposed in adjacent channels 224 of the base member 202. In at least one embodiment, the channels 224 of the base member 202 may be configured to restrict the movement or actuation of the seal segments 206 in one or more directions. For example, as illustrated in FIG. 3A, the channels 224 may extend radially along the base member 202, and the seal segments 206A and 206B may be slidably disposed in the radially extending channels 224. Accordingly, the channels 224 may be configured to restrict the seal segments 206A and 206B from being actuated in the circumferential directions, and allow the seal segments 206A and 206B to be actuated in the radial directions.

In at least one embodiment, the adjustable seal 200 may be assembled such that the seal portions 242 of the adjacent seal segments 206A, 206B may at least partially overlap with one another, thereby preventing leakage of the process fluid through the seal portions 242 and/or between the seal segments 206A, 206B. For example, as illustrated in FIG. 3B, at least one of the second arms 256B forming the second end portion 248 of the first seal segment 206A may extend into the axial gap 258A defined between the second arms 256A of the second seal segment 206B. In another example, as illustrated in FIG. 3B, at least one of the second arms 256A forming the first end portion 246 of the second seal segment 206B may extend into the axial gap 258B defined between the second arms 256B of the first seal segment 206A.

Figure 4A:
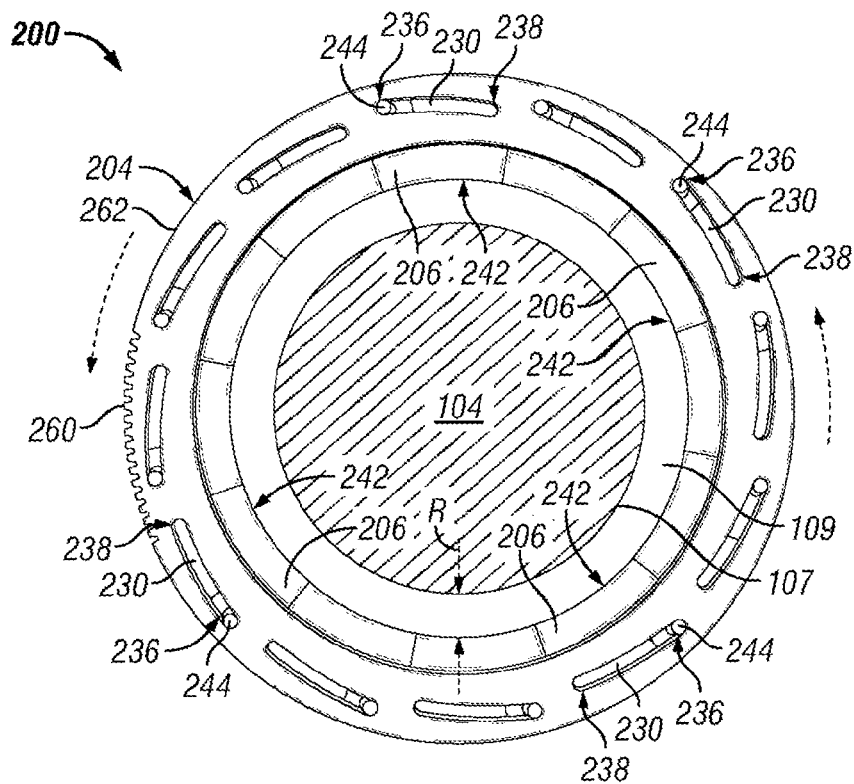
FIG. 4A illustrates a plan view of the adjustable seal of FIG. 2A including the plurality of seal segments in a retracted position, according to one or more embodiments disclosed.
Figure 4B:
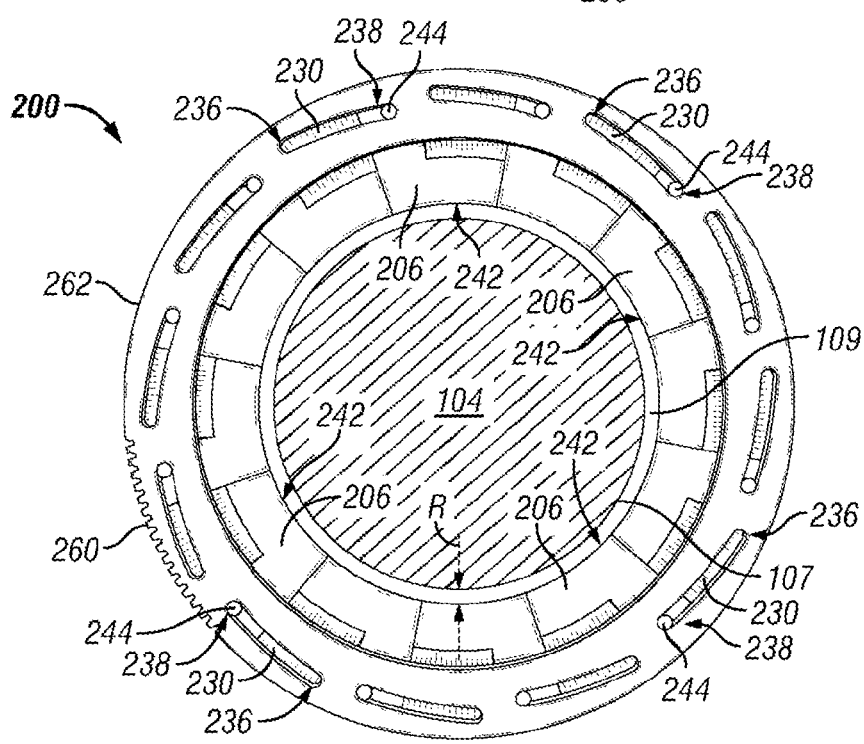
FIG. 4B illustrates a plan view of the adjustable seal of FIG. 2A including the plurality of seal segments in an extended position, according to one or more embodiments disclosed.

Referring to FIGS. 4A and 4B, the actuating member 204 may be disposed atop or adjacent the seal segments 206 such that the projection 244 of the seal segments 206 may be slidably disposed in the respective slots 230 defined in the actuating member 204. Referring briefly to FIG. 1, the adjustable seal 200 may be disposed in one or more cavities (two are indicated 111, 112) defined in a casing 113 of the turbomachine 100. For example, the adjustable seal 200 may be disposed in the cavity 112 adjacent the rotary shaft 104. As previously discussed, the seal segments 206 may at least partially define the radial gap 109 between the adjustable seal 200 and the rotary shaft 104 of the turbomachine 100. For example, referring back to FIGS. 4A and 4B, which illustrate the adjustable seal 200 disposed about the rotary shaft 104 of the turbomachine 100, a radial distance (R) between the seal portion 242 of the seal segments 206 and the outer circumferential surface 107 of the rotary shaft 104 may define the radial gap 109. As further described herein, the adjustable seal 200 may vary (i.e., increase or decrease) the radial distance (R) between the seal segments 206 and the outer circumferential surface 107 of the rotary shaft 104 to thereby vary the radial gap 109 defined therebetween.

In an exemplary operation of the adjustable seal 200, with continued reference to FIGS. 4A and 4B, the actuating member 204 may be rotated about the longitudinal axis 228 relative to the base member 202 (see FIG. 2A) to actuate the seal segments 206 and thereby vary the radial distance (R) defining the radial gap 109. FIG. 4A illustrates the seal segments 206 of the adjustable seal 200 in a retracted position where the projection 244 of the seal segments 206 may be positioned at or proximal the first end portion 236 of the respective slots 230. As previously discussed, the first end portion 236 and the second end portion 238 of the slots 230 may be radially offset with respect to one another such that the slots 230 extend radially inward from the first end portion 236 to the second end portion 238. As the actuating member 204 is rotated (e.g., counterclockwise), the projections 244 of the seal segments 206 may slide within the respective slots 230 from the first end portion 236 toward the second end portion 238. As the projections 244 slide from the first end portion 236 toward the second end portion 238 of the slots 230, the seal segments 206 may correspondingly be actuated radially inward toward the outer circumferential surface 107 of the rotary shaft 104, thereby positioning the seal segments 206 in an extended position, as illustrated in FIG. 4B. As illustrated in FIGS. 4A and 4B, the actuation of the seal segments 206 toward the rotary shaft 104 may decrease the radial distance (R) between the seal segments 206 and the outer circumferential surface 107 of the rotary shaft 104 and thereby decrease the radial gap 109 defined therebetween. In at least one embodiment, decreasing the radial distance (R) defining the radial gap 109 may correspondingly decrease leakage of the process fluid through the radial gap 109. Decreasing the leakage of the process fluid through the radial gap 109 may correspondingly increase the efficiency and/or performance of the turbomachine 100.

It may be appreciated that the actuating member 204 may also be rotated such that the projections 244 of the seal segments 204 slide from the second end portion 238 toward the first end portion 236. As the projections 244 slide from the second end portion 238 toward the first end portion 236, the seal segments 206 may correspondingly be actuated radially outward to thereby position the seal segments 206 in the retracted position, as illustrated in FIG. 4A. As illustrated in FIGS. 4A and 4B, the actuation of the seal segments 206 in the radially outward direction may increase the radial distance (R) between the seal segments 206 and the outer circumferential surface 107 of the rotary shaft 104 and thereby increase the radial gap 109 defined therebetween. In at least one embodiment, increasing the radial distance (R) defining the radial gap 109 may correspondingly increase leakage of the process fluid through the radial gap 109. Increasing the leakage of the process fluid through the radial gap 109 may correspondingly decrease the efficiency and/or performance of the turbomachine 100. It may further be appreciated that the radial offset between the first end portion 236 and the second end portion 238 of the slots 230 may determine, at least in part, an amount or degree in which the seal segments 206 may be actuated. For example, the radial offset between the first end portion 236 and the second end portion 238 of the slots 230 may be increased to correspondingly increase the degree in which the seal segments 206 may be radially actuated.

In at least one embodiment, the adjustable seal 200 described herein may be adjusted to one or more positions during one or more modes of operation. The one or more modes of operation may include, but are not limited to, a start-up mode, a shutdown mode, a synchronization mode, a failure event mode, a load control mode, a normal operation mode, or the like, or any combination thereof. In at least one embodiment, the adjustable seal 200 may be adjusted to the one or more positions during the one or more modes of operation to prevent damage to the adjustable seal 200 and/or surrounding components of the turbomachine 100. For example, during the start-up and/or shutdown modes of operation of the turbomachine 100 (see FIG. 1) the rotary shaft 104 may be rotated at a "critical speed." At the critical speed, the rotary shaft 104 may exhibit increased vibrations as compared to other modes of operation (e.g., normal operation mode). The increased vibrations may cause the rotary shaft 104 to contact or impact one or more surrounding components, such as the labyrinth seals 101, 103, and thereby cause damage to the rotary shaft 104 and/or the surrounding components. Accordingly, referring to FIGS. 4A and 4B, during the start-up and/or shutdown modes, the adjustable seal 200 may increase the radial distance (R) between the seal segments 206 and the rotary shaft 104 to thereby increase the radial gap 109 defined therebetween. Increasing the radial distance (R) defining the radial gap 109 may allow the rotary shaft 104 to accommodate the increased vibrations of the rotary shaft 104 and thereby prevent the rotary shaft 104 from contacting or impacting the adjustable seal 200.

In at least one embodiment, a control system (not shown) may be operatively coupled with the adjustable seal 200 and/or the turbomachine 100 to monitor and/or control one or more components thereof. The control system may include the following features, functions, and/or operations: automated unmanned operation under a dedicated control system; local and remote human machine interfacing capabilities for data access, data acquisition, unit health monitoring and operation; controlled start-up, operation, and shutdown; fully automated start-up, alarm, shutdown, process adjustment, data acquisition and synchronization; control and power management system for interfacing with an external distributed plant control system.

The control system may be communicably and/or operatively coupled with the gear 232, the adjustable seal 200, and/or components thereof, such as the actuating member 204, the base member 202, and/or the plurality of seal segments 206. The control system may be communicably coupled via any suitable means including, but not limited to, wired connections and/or wireless connections. In one or more embodiments, the control system may be configured to actuate, adjust, manipulate, and/or otherwise control one or more components of the turbomachine 100, such as the gear 232 of the turbomachine 100. The control system may also be configured to monitor one or more parameters of the turbomachine 100 including, but not limited to, the radial distance (R) or radial gap 109 defined between the rotary shaft 104 and the adjustable seal 200. The control system may further be configured to implement one or more processes and/or modes of operation for the turbomachine 100.

Figure 5:
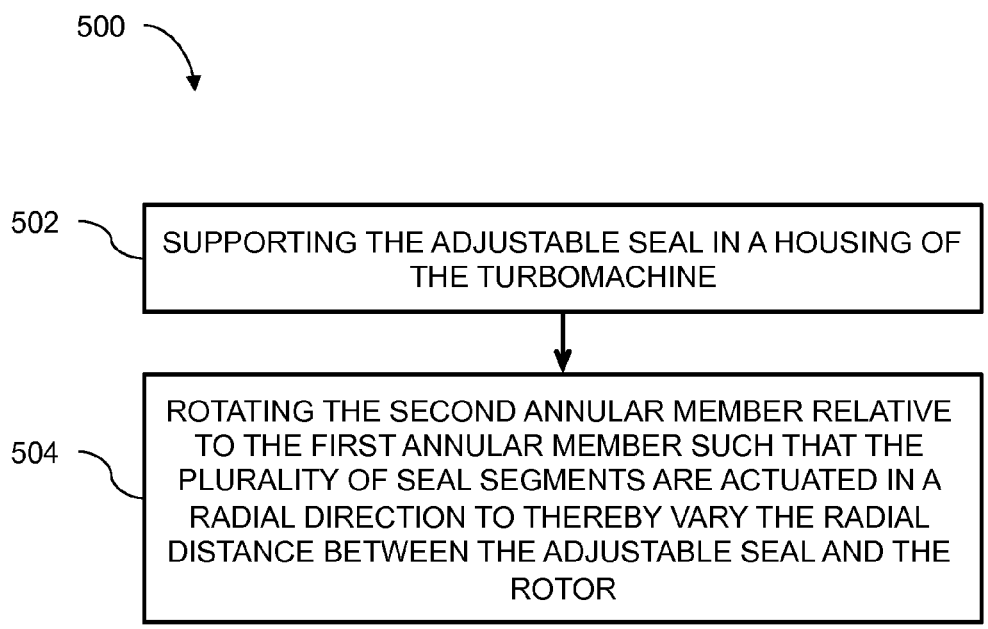
FIG. 5 illustrates a flowchart of a method for varying a radial distance defined between an adjustable seal and a rotor of a turbomachine, according to one or more embodiments disclosed.

FIG. 5 illustrates a flowchart of a method 500 for varying a radial distance defined between an adjustable seal and a rotor of a turbomachine, according to one or more embodiments. The method 500 may include supporting the adjustable seal in a housing of the turbomachine, as shown at 502. The adjustable seal may be disposed radially outward of the rotor of the turbomachine and may include a first annular member defining a plurality of radial channels, and a second annular member concentric with the first annular member and defining a plurality of slots at least partially extending therethrough. The adjustable seal may also include a plurality of seal segments interposed between the first annular member and the second annular member. Each seal segment of the plurality of seal segments may be slidably disposed in a respective radial channel of the plurality of radial channels and may include an axial projection slidably disposed in a respective slot of the plurality of slots. The method 500 may also include rotating the second annular member relative to the first annular member such that the plurality of seal segments may be actuated in a radial direction to thereby vary the radial distance between the adjustable seal and the rotor, as shown at 504.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. An adjustable seal, comprising:
  a first annular member defining a plurality of radial channels;
  a second annular member defining a plurality of slots at least partially extending therethrough, the second annular member concentric with the first annular member and configured to rotate relative to the first annular member; and
  a plurality of seal segments interposed between the first annular member and the second annular member, each seal segment of the plurality of seal segments being slidably disposed in a respective radial channel of the plurality of radial channels and having an axial projection slidably disposed in a respective slot of the plurality of slots.

2. The adjustable seal of claim 1, wherein each seal segment of the plurality of seal segments comprises:
  a body portion configured to be slidably disposed in the respective radial channel of the plurality of radial channels, the axial projection extending from the body portion; and
  a seal portion extending circumferentially from the body portion.

3. The adjustable seal of claim 2, wherein each seal segment of the plurality of seal segments is formed from a plurality of seal elements, each seal element of the plurality of seal elements having a first arm and a second arm, and coupled with an adjacent seal element via respective first arms, thereby forming the body portion of each seal segment of the plurality of seal segments.

4. The adjustable seal of claim 3, wherein each seal portion comprises:
  a first end portion extending from the respective body portion in a first circumferential direction; and
  a second end portion extending from the respective body portion in a second circumferential direction.

5. The adjustable seal of claim 4, wherein:
  the second arms of adjacent seal elements of the plurality of seal elements extend from the body portion in the first circumferential direction and the second circumferential direction, respectively,
  each second arm extending in the first circumferential direction forms the first end portion of each seal portion, and
  each second arm extending in the second circumferential direction forms the second end portion of each seal portion.

6. The adjustable seal of claim 5, wherein:
  each second arm extending in the first circumferential direction defines an axial gap in the first end portion of each seal portion, and
  each second arm extending in the second circumferential direction defines an axial gap in the second end portion of each seal portion.

7. The adjustable seal of claim 1, wherein the second annular member defines a plurality of teeth extending along at least a portion of an outer circumferential surface thereof, the plurality of teeth configured to engage with and be driven by a gear.

8. The adjustable seal of claim 1, wherein the plurality of slots defined in the second annular member are curved radially inward.

9. A turbomachine comprising:
  the adjustable seal of claim 1; and
  a rotary shaft supported in a housing of the turbomachine, the adjustable seal disposed radially outward of the rotary shaft, such that the plurality of seal segments and an outer circumferential surface of the rotary shaft define a radial clearance, and the second annular member is configured to rotate relative to the first annular member to thereby actuate the plurality of seal segments towards the outer circumferential surface of the rotary shaft.

10. An adjustable seal for a turbomachine, comprising:
  a first annular member having a plurality of protrusions extending axially from an annular surface thereof, the plurality of protrusions at least partially defining a plurality of radial channels;
  a second annular member defining a plurality of slots at least partially extending therethrough, the second annular member aligned with the first annular member about a longitudinal axis and configured to rotate relative to the first annular member about the longitudinal axis; and
  a plurality of seal segments interposed between the first annular member and the second annular member, each seal segment of the plurality of seal segments being slidably disposed in a respective radial channel of the plurality of radial channels and having an axial projection slidably disposed in a respective slot of the plurality of slots.

11. The adjustable seal of claim 10, wherein each seal segment of the plurality of seal segments comprises:
  a body portion configured to be slidably disposed in the respective radial channel of the plurality of radial channels, the axial projection extending from the body portion; and
  a seal portion comprising:
    a first end portion extending from the body portion in a first circumferential direction; and
    a second end portion extending from the body portion in a second circumferential direction.

12. The adjustable seal of claim 11, wherein the seal portions of adjacent seal segments of the plurality of seal segments at least partially overlap with one another.

13. The adjustable seal of claim 10, wherein the second annular member defines a plurality of teeth extending along at least a portion of an outer circumferential surface thereof, the plurality of teeth configured to engage with and be driven by a gear of the turbomachine.

14. The adjustable seal of claim 10, wherein each slot of the plurality of slots is curved radially inward.

15. A method for varying a radial distance between an adjustable seal and a rotor of a turbomachine, comprising:
   supporting the adjustable seal in a housing of the turbomachine, the adjustable seal disposed radially outward of the rotor of the turbomachine and comprising:
      a first annular member defining a plurality of radial channels;
      a second annular member concentric with the first annular member and defining a plurality of slots at least partially extending therethrough; and
      a plurality of seal segments interposed between the first annular member and the second annular member, each seal segment of the plurality of seal segments is slidably disposed in a respective radial channel of the plurality of radial channels and has an axial projection slidably disposed in a respective slot of the plurality of slots; and
   rotating the second annular member relative to the first annular member such that the plurality of seal segments are actuated in a radial direction to thereby vary the radial distance between the adjustable seal and the rotor.

16. The method of claim 15, wherein rotating the second annular member relative to the first annular member comprises rotating the second annular member with a gear of the turbomachine, the gear configured to engage a plurality of teeth formed along at least a portion of an outer circumferential surface of the second annular member.

17. The method of claim 15, wherein rotating the second annular member relative to the first annular member actuates the plurality of seal segments toward the rotor of the turbomachine to thereby decrease the radial distance between the adjustable seal and the rotor.

18. The method of claim 15, wherein rotating the second annular member relative to the first annular member actuates the plurality of seal segments away from the rotor of the turbomachine to thereby increase the radial distance between the adjustable seal and the rotor.

19. The method of claim 15, wherein rotating the second annular member relative to the first annular member actuates the axial projection of each seal segment of the plurality of seal segments in the respective slot of the plurality of slots.

20. The method of claim 15, wherein each seal segment of the plurality of seal segments comprises:
   a body portion configured to be slidably disposed in the respective radial channel of the plurality of radial channels, the axial projection extending from the body portion; and
   an arcuate seal portion comprising:
      a first end portion extending from the body portion in a first circumferential direction; and
      a second end portion extending from the body portion in a second circumferential direction.

* * * * *